May 15, 1934.　　　　E. HEDLOF　　　　1,959,270
AEROPLANE
Filed June 2, 1933　　　3 Sheets-Sheet 1

May 15, 1934.  E. HEDLOF  1,959,270
AEROPLANE
Filed June 2, 1933    3 Sheets-Sheet 2

Ernest Hedlof
INVENTOR
BY Victor J. Evans & Co.
ATTORNEY

May 15, 1934.     E. HEDLOF     1,959,270
AEROPLANE
Filed June 2, 1933     3 Sheets-Sheet 3
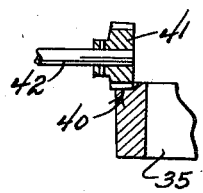
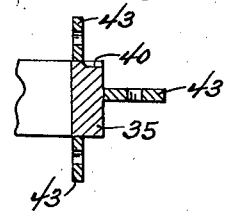
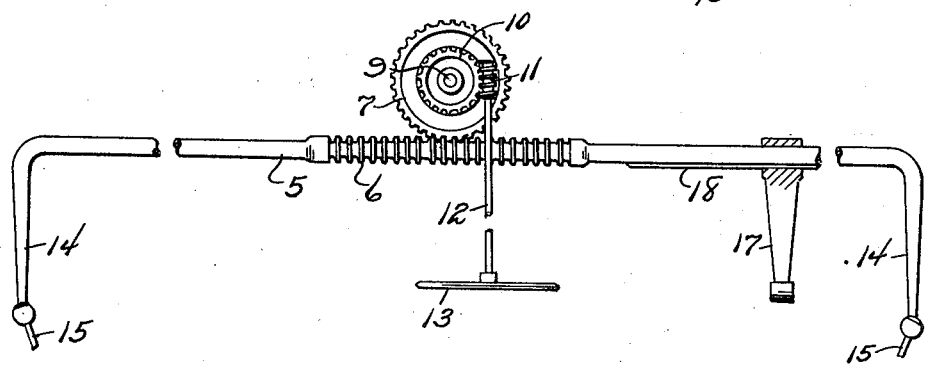
Ernest Hedlof
INVENTOR
BY Victor J. Evans & Co.
ATTORNEY Patented May 15, 1934

1,959,270

UNITED STATES PATENT OFFICE 1,959,270

AEROPLANE

Ernest Hedlof, South Chicago, Ill.

Application June 2, 1933, Serial No. 674,094

2 Claims. (Cl. 244—15)

This invention relates to aeroplanes and more particularly aeroplanes of the helicopter type, the object being to provide a novel arrangement and construction of parts whereby the ship may be caused to rise vertically from the ground and may be steered in any given direction while the number of parts may be reduced to acquire minimum weight within the margin of safety.

The invention is illustrated in the accompanying drawings and will be hereinafter set forth and defined.

In the drawings:—

Figure 5 is an enlarged detail section of the means of disposing the side blades or shutters at a desired angle relative to the line of movement of the ship.

Figure 6 is a detail section on the line 6—6 of Figure 5.

Figure 7 is a detail section on the line 7—7 of Figure 5.

Figure 8 is a detail of the means for controlling the ailerons.

Figure 1:
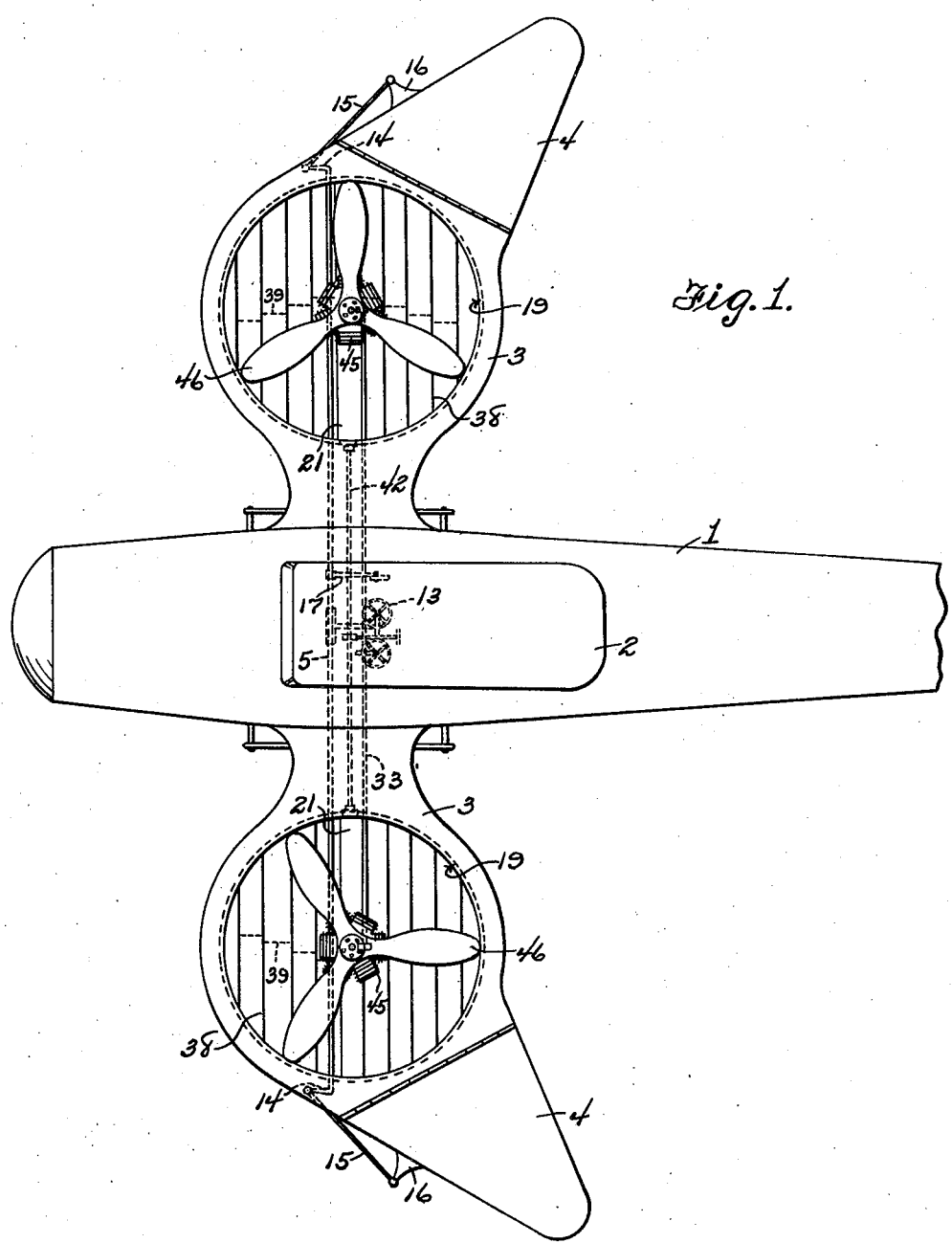
Figure 1 is a top plan view of an aeroplane embodying the present invention.

The fuselage 1 is of a conventional or any approved design and is provided with a cabin 2 in which the pilot and passengers are seated. Extending from each side of the fuselage, near the forward end thereof, is a small wing 3 which is approximately circular in outline when viewed from above and to which is hinged an aileron 4. The hinges connecting the ailerons to the wings are disposed at such an angle relative to the wings that the ailerons extend outwardly and rearwardly from the wings and the ailerons may be substantially triangular in outline. The ailerons are controlled from the cabin through means which are illustrated in particular in Figure 8 and comprise a main controlling rod or shaft 5 which is mounted in suitable bearings in the fuselage and is provided at the central portion of its length with annular ribs 6 with which is engaged a gear 7 suitably mounted within the cabin on a shaft 9 which also carries a smaller gear 10, the latter gear meshing with a worm 11 on a shaft 12 which extends to a point within convenient reach of the pilot and is equipped with a controlling wheel of any approved design. The end portions of the shaft 5 are preferably tubular in form so as to reduce the weight without loss of strength and at their extremities are provided with arms 14 which extend generally downward from the shaft and are connected by links 15 with brackets 16 on the forward sides of the ailerons so that movement imparted to the shaft will be transmitted to the ailerons to set the latter. When the shaft 12 is rotated the gear 7 will also be rotated and will act upon the shaft 5 through engagement with the rib 6 to shift the shaft endwise so that the ailerons will be moved respectively upwardly and downwardly. When the shaft is in its central position, as illustrated in Figure 8, the ailerons will both extend from the respective wings in horizontal planes but by shifting the shaft endwise one aileron will be set at an upward inclination while the other aileron will be set at a relative downward inclination. The shaft is rotatable in its bearings as well as slidable and a lever 17 is fitted upon the shaft so as to rock the same when it is desired to adjust the ailerons upwardly or downwardly without disturbing the previous adjustment given them through the sliding operation of the shaft. The lever 17 has its hub slidably mounted upon the shaft but splined upon the shaft by reason of a rib or key 18 on the shaft fitting in a longitudinal groove in the lever hub so that the shaft may move endwise through the lever but will be constrained to rock when the lever is rocked.

Figure 3:
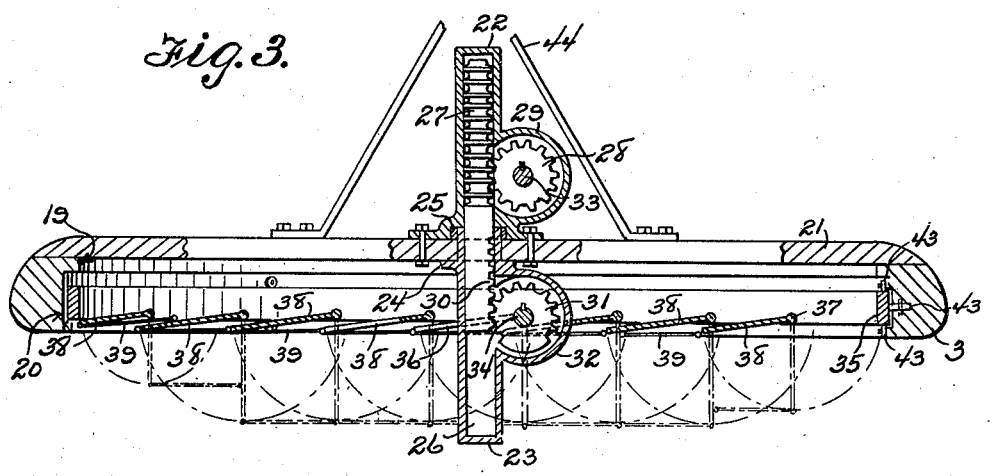
Figure 3 is an enlarged section through one of the wings.
Figure 4:
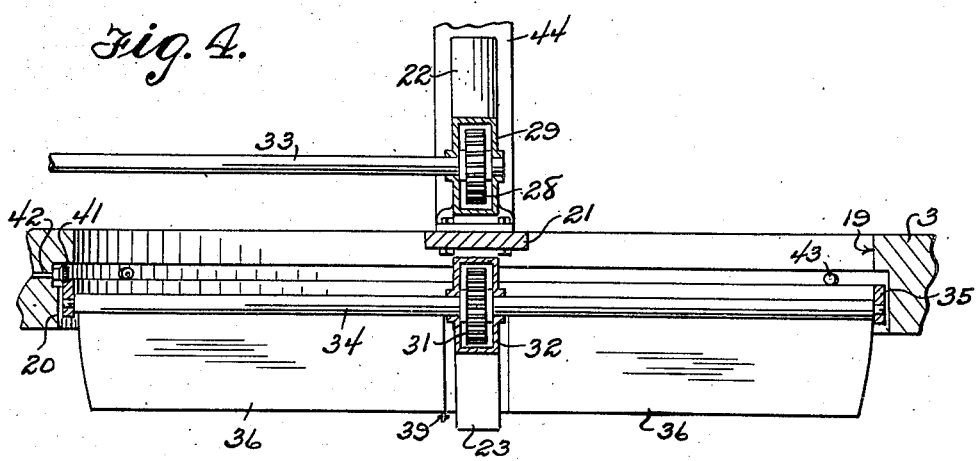
Figure 4 is a section similar to Figure 3 but taken at a right angle to said figure.

An opening 19 is formed through each wing and the wall of this opening is formed with a groove, as shown in Figure 4 at 20. A bracket or bar 21 extends diametrically across the opening 19 and is secured at its ends upon the wing whereby it is enabled to furnish a firm support for an adjusting shaft and mechanism which will now be described. Secured firmly upon the upper side of the bar or bracket 21, at the center thereof, is a tubular standard 22 having a closed upper end and having its lower end provided with an annular flange resting on the bar. A lower tube or bearing 23 is arranged in axial alinement with the upper tube 22 and has its upper end fitted through the sustaining bar or bracket 21, as shown clearly in Figure 3, this lower tube being provided with an annular rib 24 adjacent its upper end to bear against the underside of the sustaining bar and provided at its upper end with a flange 25 which bears upon the upper side of the bar and is housed within a recess provided therefor in the lower end of the upper tube 22. The upper tube will thus be fixed in position upon the bar but the lower tube may rotate about its axis although it will be firmly held against dropping. Within the casing consisting of the tubes 22 and 23 is a rack bar 26 which has a circular cross section in its upper portion and is provided with regularly spaced annular ribs 27 which mesh with a gear wheel 28 mounted with a gear case or enlargement 29 formed on the side of the tube 22. The lower portion of the rack bar is non-circular in cross section so that while it may slide endwise in the tube it cannot rotate therein but may rotate with the tube. The lower rack bar has teeth 30 on one side meshing with a segmental gear 31 in a gear case or enlargement 32 on the side of the tube 23. A controlling shaft 33 has one end journaled in the gear case 29 and carries the gear 28, the opposite end of the shaft being suitably mounted within the cabin within the convenient reach of the pilot and equipped with any approved form of handle or manipulating element. The gear 31 is secured to a shutter or blade controlling shaft 34 which is extended through the sides of the gear case 32 and is journaled at its ends in a ring 35 which is mounted in the annular grooves 20 in the wing and it may be noted at this point that the shafts are duplicated so that the blades or shutters are provided in each wing. The main blade or shutter 36 is secured to the shaft 34 and arranged parallel with said shaft and said blade are other shafts 37 and blades 38 provided in such number that when the blades are swung upwardly, as shown in Figure 3, the opening 19 through the wing will be approximately closed. Connections, indicated at 39, are provided between the adjacent blades or shutters so that the movement of one in opening or closing will be transmitted to all of the others and simultaneous operation thereof will be effected.

The ring 35 is provided upon its upper side with rack teeth 40 with which meshes a pinion 41 on the end of a shaft 42 which is journaled in suitable bearings provided therefor in the wing and extends to a convenient point in the cabin. By suitably rocking the shaft 42 the ring 35 may be turned through a quarter of a circle and thus bring the blades or shutters into any desired angular relation to the path of the aeroplane. Rollers 43 are provided at intervals around the opening in the wing and these rollers are disposed in sets of three, as shown in Figure 7, so that one roller will bear against the top of the ring, one against the bottom thereof and one against the outer side, thereby retaining the ring in proper position within the groove of the wing and permitting it to rotate with minimum friction.

Figure 2:
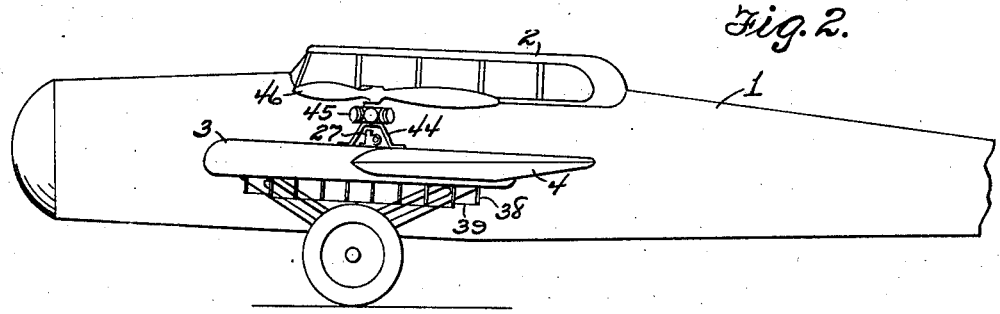
Figure 2 is a side elevation of the same.

Upon the upper side of the bar 21 is a frame 44 which provides a support for a shaft of a motor 45, the axle of the shaft being disposed at a right angle to the plane of the wing, as will be understood upon reference to Figures 1 and 2. The motor shaft is extended above its support and above the motor and has secured thereto a propeller 46 which is so disposed as to operate in a plane parallel with the plane of the wing.

It is obvious from the foregoing description that the propellers will act to lift the aeroplane vertically from the ground and may be operated so as to retard its descent and thereby accomplish a safe, easy landing. The motors are illustrated as directly under the propellers and this arrangement is preferred on account of its convenience but it will, of course, be understood that the motors may be located in the cabin or at some other point in the fuselage and connected to the propellers by suitable gearing, but the propellers are always arranged over the wings and in planes parallel with the planes of the respective wings.

If the blades or shutters be fully opened so as to depend vertically from the wings, as indicated by dotted lines in Figure 3, the air driven downwardly by the propellers will pass vertically through the wings and the ship will rise vertically from the ground. If the blades or shutters be set at a forward inclination, the machine will be driven rearwardly and if the blades be set at a rearward inclination the ship will be driven forwardly so that it may acquire headway while it is rising in a manner similar to that of the usual planes. The air driven downwardly by the propellers will spread beneath the wings and thereby create a sustaining force acting on the under side of the wings, thereby cooperating with the force exerted directly by the propellers to raise the ship and maintain it in the position of flight. The usual propellers and rudders may be dispensed with, thereby reducing the usual dead weight of the ship and increasing its buoyancy and also permitting the use of small wings for sustaining the ship. The ailerons will aid in sustaining the ship in the usual manner and may be very easily set in a desired position by manipulation of the described mechanism. Rotation of the shaft 42 will act directly through the pinions 41 and the rack 40 to set the blade-carrying wings at a desired obliquity relative to the fuselage and thus dispose the blades or shutters so that a sidewise movement may be given the ship in flight, and opening or closing of the blades is accomplished through rotation of the shaft 33, which through the gear 28 and the rack 27 will effect a vertical movement of the rack bar 26, this vertical movement being translated into a rotary movement of the shaft 34 through the gear 31. Rotation or rocking of the shaft 34 will, of course, set the blades in open, partially open or closed position and also set them at a forward or rearward inclination.

The apparatus is very simple and compact and may be easily manipulated to control the flight of a ship.

Having described the invention, I claim:

1. An aeroplane comprising a fuselage, wings on the sides of the fuselage having openings therethrough, rings supported in said openings, means for turning said rings about the axes of the respective wings, a shaft mounted in each ring to follow the movements thereof, means for rocking said shaft, means for turning the ring, a main blade secured to said shaft, and other blades mounted in the ring parallel with the main blade, the several blades being connected whereby to operate simultaneously.

2. An aeroplane comprising a fuselage, wings secured to the sides of the fuselage and having openings therethrough, a plurality of blades mounted in the wing to swing upwardly or downwarly and to turn about the axis of the wing, a rack bar mounted for turning and vertical sliding movement upon the wing, a gear meshing with the lower portion of the rack bar and connected with the blades, a gear meshing with the upper portion of the rack bar to effect vertical movement of the rack bar, and means on the fuselage for rocking the last-mentioned gear.

ERNEST HEDLOF.